United States Patent [19]

Perrino et al.

[11] Patent Number: 4,850,108
[45] Date of Patent: Jul. 25, 1989

[54] STRIPPING DEVICE

[75] Inventors: Joseph A. Perrino, Rehoboth, Mass.; Gary F. Perrino, Cranston, R.I.

[73] Assignee: Micro Electronics, Inc., Rehoboth, Mass.

[21] Appl. No.: 98,012

[22] Filed: Sep. 17, 1987

[51] Int. Cl.$^4$ .............................................. B21F 13/00
[52] U.S. Cl. .................................... 30/90.4; 30/90.1; 81/90.4
[58] Field of Search ..................... 30/90.1, 90.2, 90.3, 30/90.4, 140; 81/9.41

[56] References Cited

U.S. PATENT DOCUMENTS

| 2,283,343 | 5/1942 | Weiskopf | 30/140 |
| 3,107,287 | 10/1963 | Schechten | 30/140 |
| 3,354,478 | 11/1967 | Allen | 30/140 |
| 4,271,729 | 6/1981 | Perrino et al. | 30/90.1 |

Primary Examiner—Frank T. Yost
Assistant Examiner—Willmon Fridie, Jr.
Attorney, Agent, or Firm—Salter & Michaelson

[57] ABSTRACT

A device for stripping an outer protective material from a transmission-carrier, the device including hand-held grip members that are pivotally mounted at one end thereof, the other ends of the grip members being movable relative to each other to and from a closed stripping position, a guide member being located at the pivot end of the grip members and receiving therein the lead-in portion of the transmission carrier from which the protective material is to be stripped. Blade members are located adjacent to the guide member and are engageable by the grip members for movement by the grip members into engaging relation with the protective material during a stripping operation, wherein the blade members penetrate into the protective material. In order to facilitate the stripping operation, a heating member is provided for heating the portion of the protective material to be stripped to a temperature sufficient to produce a softening thereof, whereafter a longitudinal retracting movement of the transmission carrier strips the protective material from the lead-in portion thereof without scoring or impairing the physical characteristics of the transmission carrier.

11 Claims, 2 Drawing Sheets

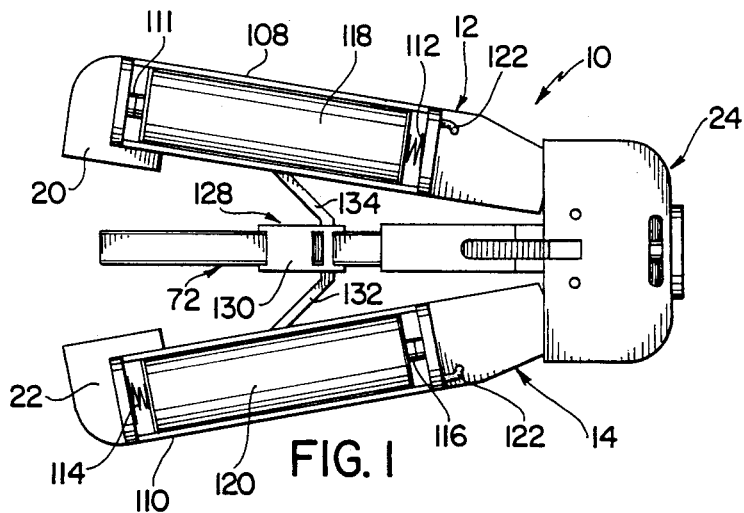
FIG. 1
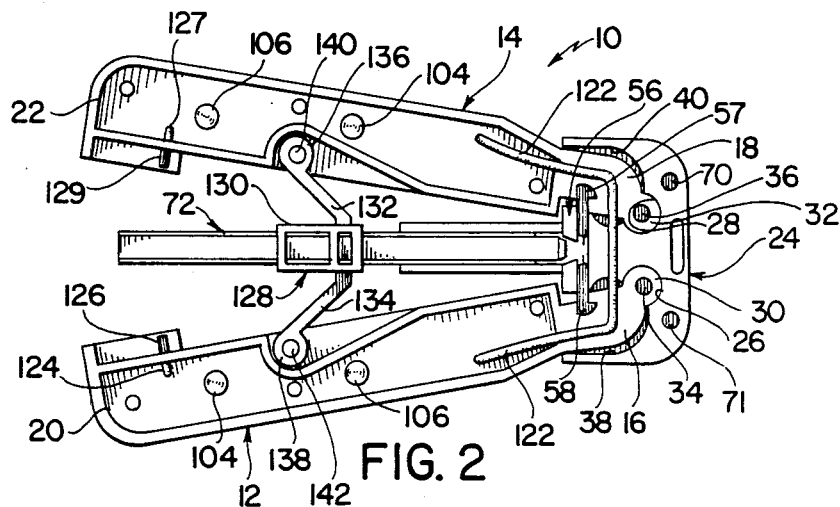
FIG. 2
FIG. 3
FIG. 4
FIG. 5

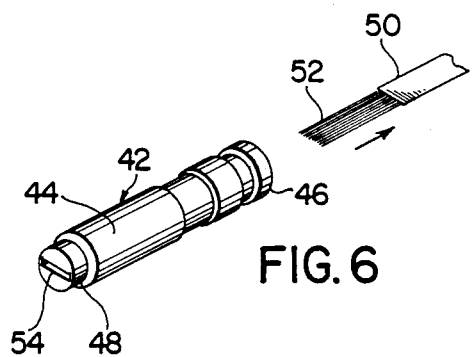
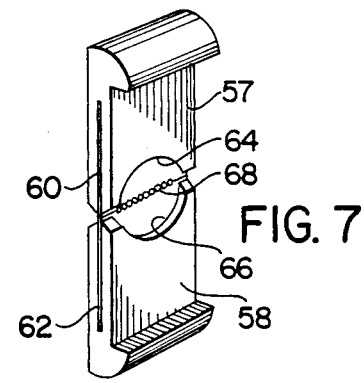
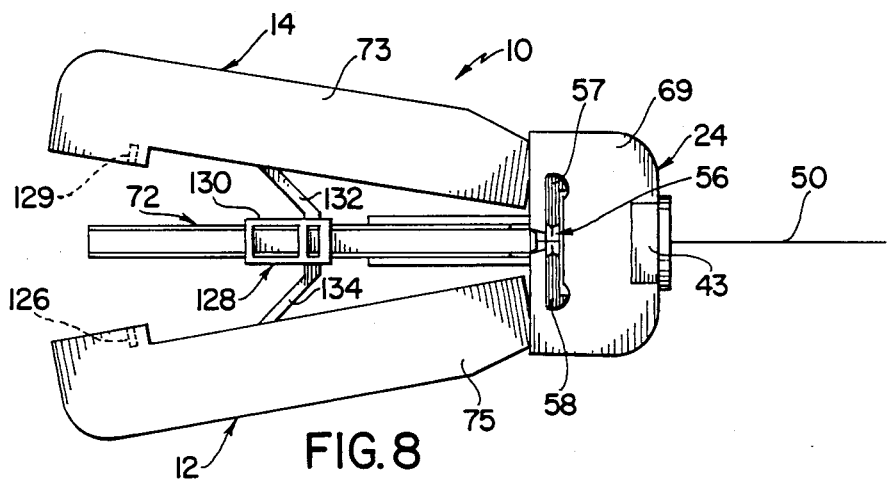
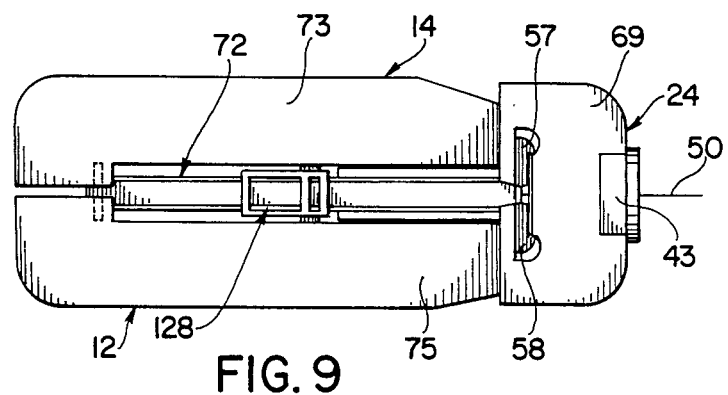
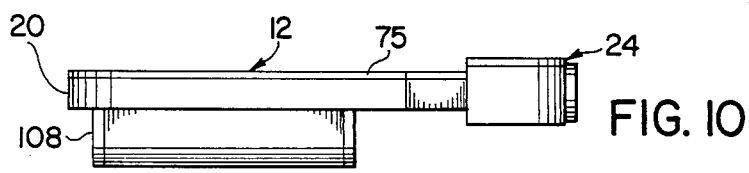

STRIPPING DEVICE

BACKGROUND OF THE INVENTION

The present invention relates to a stripping device and has particular application as a portable, hand-held device for use in easily stripping a protective material from electrical wiring or fiber optic strands that are normally difficult to penetrate or strip.

Devices for use in the stripping of protective material from certain kinds of electrical wire or fiber optic strands have been known heretofore, although such devices have not been entirely satisfactory in the stripping of protective material of certain kinds of fiber optics that have included arrays of strand. In such arrays, the fiber optic strands are located in side-by-side relation, each strand of the array having a protective material applied thereto. In addition, a plastic tape or ribbon material is applied over the fiber optic strands to secure the strands in a unitary assembly.

Although various techniques and devices have been proposed for stripping such fiber optic arrays, none of them have been satisfactory for commercial use and have been particularly deficient in successfully penetrating both the tape material overlaying the fiber optic strands and the protective material of each strand in the array. Prior known efforts to resolve the problem of stripping of such fiber optic strand arrays have included the application of heat to the stripping blades, but these prior known thermal devices have not been able to control the amount of heat applied to the array since the stripping blades of the device were heated; and not only have these devices been unsuccessful in stripping the coating from the fiber optic strands, but since they normally applied heat to the blade members, charring of the protective material occurred which resulted in a messy adhesive that could not be easily stripped, or the stripping scored the strands or in some way impaired the transmission quality of the strands which was completely unsatisfactory for the intended use thereof.

As will be described herein, the subject invention performs a stripping operation in a precise manner for the purpose intended and represents a distinct improvement over those devices known heretofore for the stripping of fiber optic strands and/or insulated wire.

SUMMARY OF THE INVENTION

The present invention is directed particularly to a device of the type illustrated in U.S. Pat. Ser. No. 4,271,729, but is modified to strip protective material that is usually found on fiber optic strands and that is normally difficult to penetrate. In accomplishing a stripping operation of such material, the present invention provides for preheating the protective material to produce a softening thereof which thereafter enables the stripping operation to be easily accomplished.

The stripping device as embodied in the present invention includes a pair of hand-held grip members that are pivotally mounted in an end block located at one end thereof as illustrated in U.S. Pat. Ser. No. 4,271,729. The other ends of the grip members are maintained in spaced-apart relation by spring arms and are movable to and from a closed stripping position against the action of the spring arms. Located in the end block in which the arms are pivotally mounted is an axially extending guide tube in which a bore is formed for receiving the material to be stripped. One of the objects of the subject invention is to strip protective material from a fiber optic array of strands, wherein the strands are located in side-by-side, parallel relation. For this purpose, the guide tube is formed with a corresponding slot configuration for receiving the fiber optic array, the array being directed inwardly through the guide slot to a stripping station. Mounted in the end block at the stripping station are opposed blade members which are especially formed for penetrating the protective material of the individual fiber optic strands as located in the assembled array. Thus, in the subject invention, the blade members are formed with a plurality of cutting notches therein corresponding to the number of fiber optic strands located in the array to be stripped. The individual cutting notches in each blade member are aligned so as to receive a fiber optic strand therein in much the same manner as disclosed in U.S. Pat. Ser. No. 4,271,729 for the stripping of an individual strand of wire.

When the subject invention is utilized for the purpose of stripping a plurality of fiber optic strands as located in an array, a unique and especially constructed heating chamber is utilized for softening the end of the array of strands to be stripped by the preheating thereof. For this purpose, the heating chamber includes a strip heating element formed of a conducting material that is energized through a battery-operated circuit. An end of the heating element is configured to define a resistance zone, and the heating element is confined in a housing to form a heating zone. By locating an end of the material to be stripped in the housing and generating heat therein through the heating element, the protective material is sufficiently softened to provide for the effective stripping thereof from the softened end. Since the blade members which have been moved to the stripping position during the heating period effectively penetrate into the protective material located around the fiber optic strands, a longitudinal retracting movement of the fiber optic strand array will cause the protective material located in the heating zone to be stripped from the array.

Accordingly, it is an object of the present invention to provide a hand-held stripping device that includes a unique electrically responsive heating element that preheats the material to be stripped for softening the material and thereby enabling an effective and efficient stripping operation to be performed.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a bottom plan view of the stripping device as embodied in the present invention and illustrating the batteries as mounted on the grip members, the grip members being shown in the open or nonstripping position thereof;

FIG. 2 is a top plan view of the stripping device with the top portions of the grip members being removed and showing the location of the wiring interconnecting the heating element batteries and further, showing the position of the heating chamber in the nonstripping location;

FIG. 3 is an assembled perspective view of the heating chamber that is utilized to preheat the protective material to be stripped;

FIG. 4 is an exploded perspective view of the elements that comprise the heating chamber;

FIG. 5 is a sectional view taken along line 5—5 in FIG. 3;

FIG. 6 is an exploded perspective view showing a tubular guide and slot as formed therein as contemplated for use in the subject invention, wherein a multi-stranded fiber optic array is directed to a stripping station as located in the stripping device;

FIG. 7 is a perspective view of the blade members of the subject stripping device in which a plurality of cutting notches are formed for receiving therein the individual strands of the fiber optic array for the stripping of the protective material therefrom;

FIG. 8 is a top plan view of the stripping device as embodied in the subject invention with the fiber optic array located in the position for stripping and prior to the stripping operation;

FIG. 9 is a top plan view of the stripping device similar to FIG. 8 with the grip members shown in the closed position, wherein the heating chamber has been moved forwardly into the stripping station and has been activated for preheating the protective material surrounding fiber optic strands;

FIG. 10 is a side elevational view of the stripping device as illustrated in FIGS. 8 and 9.

DESCRIPTION OF THE INVENTION

Referring now to the drawings and particularly to FIGS. 1 and 2, the stripping device embodied in the present invention is generally indicated at 10 and, as illustrated, is of the hand-held type that is designed to strip protective material from small-diameter wire conductors and from fiber optic transmission carriers, such as conventional single and multi-stranded fiber optic arrays. As will be described hereinafter, the subject invention has particular application in the stripping of protective material from the individual strands or transmission carriers of a fiber optic array of material and includes a heating chamber for presoftening the protective material prior to the stripping operation. For purposes of the description of the subject invention, reference is made to U.S. Pat. Ser. No. 4,271,729, which discloses a wire stripping device, the individual elements of which are substantially similar to the subject invention. In this connection, the general constructional arrangement of the stripping device as shown in U.S. Pat. Ser. No. 4,271,729 and the manner in which the wire stripping operation is performed therein is substantially the same as in the subject invention, as will be described hereinafter, with the exception that the subject invention includes apparatus for preheating the material to be stripped to provide for a softening thereof to facilitate the stripping action.

Referring again to FIGS. 1 and 2, the stripping device 10 as shown includes substantially identically formed grip members generally indicated at 12 and 14 that are preferably molded of a durable plastic material and that are generally elongated in shape and configuration. As shown more particularly in FIG. 2, the grip members 12 and 14 include toe portions 16 and 18, respectively, while formed on the rearmost ends thereof are heel portions 20 and 22, respectively. The heel portions 20 and 22 are movable toward and away from each other during the stripping operation as controlled by the hand of the user, the toe portions 16 and 18 being pivotally mounted in an end block generally indicated at 24. Formed in the end block 24 are generally circular recesses 26 and 28 that receive therein correspondingly shaped projections 30 and 32 that are formed as extensions of the toe portions 16 and 18, respectively. The projections 30 and 32 have suitable openings 34 and 36 formed therein that aid in mounting the grip members in the end block 24. It is also seen that the toe members 16 and 18 are received within recesses 38 and 40 as formed in the end block 24, sufficient spacing of the grip members 12 and 14 in the recesses 38 and 40 being provided to enable the grip members to be pivotally movable from the open position as illustrated in FIG. 2 to the closed stripping position as shown in FIG. 9.

As described in U.S. Pat. Ser. No. 4,271,729, the subject invention also includes a guide generally indicated in FIG. 6 at 42 through which the material to be stripped is directed. The guide 42 extends through a suitable bore formed in the block 24 and is held in place in the bore by a locking device 43. The guide 42 also includes a body portion 44 on which an outer flange 46 is formed that is located exteriorly of the block 24 and further includes a reduced inner neck section 48. For purposes of illustration herein, the guide 42 as mounted in the block 24 of the stripping device 10 is designed to receive a fiber optic array indicated at 50 in FIG. 6. Since the fiber optic array 50 includes a plurality of fiber optic strands indicated at 52 that are disposed in side-by-side relation and that as a unit in cross section are generally rectangular in configuration, a rectangularly shaped slot 54 is formed in the tubular guide 42 for receiving the array of fiber optic strands 50. As referred to above, the guide 42 extends through a suitable bore as formed in the block 24, the flange 46 projecting outwardly of the block 24. The reduced neck section 48 is thus located adjacent to a stripping station generally indicated at 56 in FIG. 2. In this connection, reference again is made to U.S. Pat. Ser. No. 4,271,729 and FIGS. 6, 7 and 8 therein. Also located at the stripping station 56 are spaced blade members 57 and 58 that are insertable into especially formed slots in the block 24. The blade members 57 and 58 which have a configuration as illustrated in FIG. 7, include blade elements 60 and 62, respectively, that are embedded therein, outwardly extending portions of the blade elements 60 and 62 projecting into enlarged notches 64 and 66 as shown in FIG. 7. When the blade elements 60 and 62 are moved to a stripping position opposite to each other, the notches 64 and 66 define a diameter that corresponds to that of the neck section 48 of the guide 42, thereby providing for a stop for the blade elements as they are brought to the stripping position. Formed in each of the blade elements 60 and 62 at the portion thereof exposed by the notches 64 and 68 are a plurality of small notches indicated at 68 in FIG. 7 which, when the blade members are moved to the stripping position, cooperate to form cutting edges that correspond to the diameter of the material from which the protective material is stripped. Thus, each opposed cutting notch penetrates into the protective material of each fiber optic strand when the grip members are moved to the closed stripping position thereof. The diameter of the hole defined by the mating notches 68 is predetermined in accordance with the diameter of the fiber optic strand to be stripped.

As shown in FIG. 2, the blade members 57 and 58 are insertable through convenient slots as formed in the block 24, the precise location of the blade members being clearly illustrated in U.S. Pat. Ser. No. 4,271,729. As shown in FIGS. 8 and 9, a suitable cover for the block 24 is also provided and is secured in place by convenient pins that extend from the cover 69 into corresponding openings 70 and 71 as formed in the block 24. Cover members 73 and 75 (FIG. 8) are also provided for the handle portion of the grip members 12 and 14 and are retained in place through suitable pins formed on the grip members and extend into sockets (not shown) as formed on the underside of the cover members 73 and 75.

The principal feature of the subject invention is the provision of a heating chamber generally indicated at 72 that has for its purpose the heating of a lead-in portion of an array of fiber optic strands for the presoftening thereof prior to the stripping operation. Fiber optic strands as formed in an array as illustrated in FIG. 6 are normally each provided with a protective material or coating therearound; and in order to fix the array of strands in place a Mylar strip is adhered thereover. Stripping of the fiber optic strands for exposing the individual ends thereof, as is necessary in the use of such material as transmitters in the field of communications and other areas in which fiber optics are employed, has thus become an important factor in the successful use of the materials. Because each of the fiber optic strands is formed with a coating of protective material therearound and the array of strands are bound together by an overlying strip of Mylar material, it has been difficult to strip the protective coating and overlying material from the array of strands without cutting, nicking or damaging the fiber optic cladding. Although some heating or softening techniques have been attempted, the prior known devices have usually heated the material through the stripping blades. Such devices have only charred the fiber optic material and have produced an unmanageable and messy substance that is difficult to remove. The subject invention has successfully resolved the stripping problems by preheating or presoftening the protective material and overlay as located on the fiber optic array; and, for this purpose, the heating chamber 72 is positioned immediately adjacent to the stripping station 56 as illustrated in FIG. 2. As will be described, with the lead-in portion of the fiber optic array that extends through the guide 42 positioned at the stripping station 56, the heating chamber 72 is moved forwardly to encapsulate the lead-in portion of the array to be stripped and then the lead-in portion is heated to a sufficient temperature to provide softening thereof. Thereafter the stripping action is easily accomplished by pulling outwardly on the fiber optic strip.

Referring now to FIGS. 3, 4 and 5, the heating chamber 72 is illustrated and includes a housing or carrier defined by an elongated lower member 74 and an elongated upper member 76. The upper and lower members of the heating chamber 72 are formed of a plastic material, such as a polyetherimide, that has low thermal expansion and heat retention characteristics and can withstand continuous temperatures up to 500° F. The lower member 74 includes a base 78 to which spaced sidewalls 80 and 82 are integrally joined. Extending forwardly of the sidewalls 80 and 82 as an extension of the base 78 is a tongue 84. Joined to the base 78 and spaced intermediate between the sidewalls 80 and 82 is an upwardly extending projection 86 that extends in parallel relation with respect to the walls 80 and 82 to a forward point 88 that is spaced inwardly of the lip 84.

An open space 89 is thus defined between the sidewalls 80 and 82 that enables the forward lead-in portion of the fiber optic array that is to be stripped to be received in the heating chamber. Located in the sidewalls 80 and 82 of the lower housing portion 74 are slots 90 and 92, respectively, the purpose of which will be hereinafter described.

Defining the heating element of the heating chamber 72 is a strip of conducting material 92 that is overlaid on a heat resistant carrier such as Kapton tape. The heating element 92 is formed of a foil material, such as a beryllium copper, that is tinned. The heating element 92 is notched at an end thereof as indicated at 94 to define a resistance portion, and it is seen that the temperature of the resistance portion 94 is thus increased when current is applied to the heating element 92. As illustrated in FIGS. 4 and 5, the heating element 92 is folded along the length thereof and is fitted over the projection 86. Locking the heating element 92 in place is the upper member 76 of the heating chamber that is defined by an upper wall 96 and sidewalls 98 and 100 that are joined thereto to define a U-shaped configuration. The configuration of the upper member 76 enables it to be fitted over the heating element 92, the walls 98 and 100 sliding inwardly of the walls 80 and 82 of the lower member 74, thereby locking the heating element 92 in place as shown in FIG. 5. Formed in the sidewalls 98 and 100 of the upper member 76 are slots 101 and 102 that correspond to the slots 90 and 92 and that are aligned therewith when the upper member 76 is locked in place in the lower member 74, thereby exposing the metallic heating element 92 for contact with electrical contacts as will be described.

As further shown in FIG. 3, the upper member 76 of the heating chamber 72 extends outwardly beyond the forward edges of the walls 80 and 82 of the lower member and rests on the upper surface on the lip 84. Thus, a heating zone is formed in the space 89 and is effectively disposed within the folded heating element 92. The heating zone 89 is also formed in a slot configuration that is located between the edge 88 of the projection 86, the forward edges of the upper walls 98 and 100 of the upper portion 76, the lip 84 and the adjacent walls 98 and 100 of the upper member 76. Since the resistance portion 94 of the folded heating element 92 effectively defines the heating zone 89, the heating action takes place therein, and the insertion of the lead-in portion of the array of fiber optic material will be subjected to heat in the heating zone 89 for the presoftening of the protective material and overlay strip located thereon.

In order to provide the necessary current for energizing the heating element 92 and producing the required heat at the resistance portion 94 thereof, a circuit with a current source from suitable batteries is provided as illustrated in FIGS. 1 and 2. Mounted on the grip members 12 and 14 by suitable rivets indicated at 104 and 106 are battery housings 108 and 110, which are shown with their cover plates removed. The battery housing 108 includes a fixed contact 111 mounted on one end thereof and a spring contact 112 located at the opposite end. Similarly, the housing 110 includes a spring contact 114 located at one end and a fixed contact 116 mounted in the housing at the opposite end thereof. Type AA batteries 118 and 120 are mounted in place in the housings 108 and 110 and, as will be described, are disposed in series for transmitting the required current to the heating element 92 when suitable contact is made therewith. In order to connect the batteries 118 and 120 in series, a wire lead 122 is electrically connected to the spring contact 112, and projects through a suitable hole in the grip member 12, and then is directed through the end block 24 into a suitable hole in the grip member 14 for connection to the fixed contact 116.1 The fixed contact 111 in the grip member 12 is joined by a lead 124 to a contact 126. Similarly, the spring contact 114 in the battery housing 110 is joined to a lead 127 that extends through a suitable opening in the grip member 14 for engagement with a contact 129. It is seen that when the grip members 12 and 14 are moved to the closed position thereof, the contacts 126 and 129 will extend into the openings 90, 92 and 101, 102 as formed on both sides of the lower and upper members 74 and 76 of the heating chamber 72 for engagement with the heating element 92. A complete circuit through the batteries 118 and 120 is then completed, and current is supplied to the heating element 92 for producing the necessary heat at the resistance section 94 for enveloping the lead-in portion of the fiber optic array located in the heating zone 89.

As previously mentioned hereinabove, the preheating and softening of the protective material of the fiber optic array is accomplished by moving the heating chamber 72 forwardly into the stripping station 56, thereby properly positioning the heating zone as located in the heating chamber in that position for receiving the lead-in portion of the array of fiber optic strands. In order to accomplish this purpose and to further act as a spring member for normally retaining the grip members 12 and 14 in the open position, a spring and heating chamber holder assembly generally indicated at 128 is provided. The assembly 128 includes a unitary molded construction defined by an elongated holder 130 having a substantially square cross-sectional configuration that receives the heating chamber 72 therein. Joined to the holder 130 are spring arms 132 and 134 that terminate in enlarged ends 136 and 138, respectively. Formed in each of the ends 136 and 138 is a suitable opening that provides for the mounting of the arms 132 and 134 on pins 140 and 142, respectively. Since the arms 132 and 134 are joined at the forwardmost end of the holder 130 and are angled rearwardly for securement to the pins 140 and 142, respectively, it is seen that upon a depressing or squeezing movement of the arms 12 and 14, the holder 130 is moved by the arms 132 and 134 in a forwardly direction, thereby carrying the heating chamber 72 therewith. As seen in FIG. 9, the forward movement of the heating chamber 72 places the forwardmost end thereof adjacent to the blade elements and at the stripping station 56. At this position, the heating zone 89 of the heating chamber 72 encapsulates the lead-in portion of the array of fiber optic material for the application of heat thereto.

OPERATION

When it is necessary to strip the protective material from a fiber optic array of strands as illustrated in FIG. 6, the material is inserted into the slot of the guide 42 until the lead-in portion of the material enters the slot as formed at the end of the heating zone 89 of the heating chamber 72 by the upper member 76 and the lip 84. The lead-in portion of the material at this point is displaced somewhat from the stop 88 located in the lower member 74 of the heating chamber 72. Prior to insertion of the array of material through the guide 42 and into the heating zone of the heating chamber 72, the number of strands 52 of the fiber optic material is identified that is contained in the array and the appropriate blade members 56 and 57 are selected for stripping the individual strands as required. Thus, each of the blade elements 56 and 57 will contain the identical number of notches in the blade ends that correspond to the number of strands in the array to be stripped.

With the appropriate blade members in place as indicated in FIG. 2, and the material to be stripped inserted through the guide tube 42 and past the stripping station 56 into the heating zone 89 of the heating chamber, the grip members 12 and 14 are moved to the closed position as shown in FIG. 9. In this position, the forwardmost end of the heating chamber 72 is moved by the spring arms 132 and 134 and the holder 130 to a position that is adjacent to the blade members. Moving the heating chamber 72 forwardly as described causes the lead-in portion of the array of fiber optic material to be wholly enclosed within the heating section or zone 89 of the heating chamber 72, the forwardmost end of the array being disposed approximately at the stop 88 in the heating chamber 72. With the grip members depressed in the closed position as illustrated in FIG. 9, the contacts 126 and 128 are located in electrical contact with the heating element 92, and a circuit is established through the batteries 118 and 120. The temperature at the resistance section of the heating element 92 is then increased within a few seconds; and after approximately or 6 seconds have elapsed, the temperature approaches an appropriate level to produce a sufficient generation of heat at the heating zone 89 and in which the lead-in portion of the array of fiber optic material is located. A rapid softening action of the protective material surrounding each of the fiber optic strands and the overlay material that binds the strands together then takes place.

If desired, a small lamp or time delay LED sensor can be placed in the circuit to provide a visual indicator to the operator to initiate the stripping operation. In this connection, the closing of the circuit by the contacts 126 and 130 engaging the heating element 92 will energize the LED that after a predetermined period will cause a lamp in the circuit to light, indicating that the stripping operation can be performed.

When the appropriate time has elapsed, the operator then pulls outwardly on the array of strands; and since the closed blade elements 60 and 62 of the blade members 57 and 58 have penetrated through the protective material and overlay, the stripping action will occur when the outward movement on the array of material is exerted. The stripped array is pulled free of the device, and the fiber optic material with exposed strand ends is then available for use as required. Thereafter, the grip members 12 and 14 are released, and the spring arms 132 and 134 move the grip member to the position as shown in FIGS. 1, 2 and 8 for the next operation. However, prior to the next operation, the heating chamber 72 is pulled outwardly of the holder 30 a short distance to expose the end thereof, the stripped material is then removed from the heating zone of the heating chamber, and the heating chamber is thereafter replaced in the proper position for the next operation.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for stripping a protective material from a transmission carrier, comprising a pair of elongated grip members, means for pivotally mounting said grip members at one end thereof, the other ends of said grip members being movable relative to each other to and from a closed stripping position, guide means located in said mounting means between the pivot ends of said grip members for guiding to a stripping station the lead-in portion of the transmission carrier from which said protective material is to be stripped, blade means located in said mounting means and being engageable by said grip members for movement by said grip members into engaging relation with said protective material during a stripping operation wherein said blade means penetrate into said protective material, and housing means located between said grip members and receiving interiorly thereof the lead-in portion of the protective material to be stripped from said transmission carrier, said housing means having heating means disposed therein for heating the lead-in portion of said protective material to be stripped to a temperature sufficient to produce a softening thereof, whereafter a longitudinal retracting movement of said transmission carrier strips the protective material from the lead-in portion thereof.

2. A device for stripping a protective material as claimed in claim 1, said transmission carrier including a plurality of strands arranged in side-by-side, parallel relation to define an array that defines a substantially rectangular, cross-sectional configuration, each of said strands in said array having a protective material disposed thereon, said guide means having a passage formed therein that is substantially rectangular in cross section and that is dimensioned to receive said plurality of strands therein.

3. A device for stripping a protective material as claimed in claim 2, said blade means including complementary blade members, each of which is formed with a plurality of notches, said notches of complementary blade members being dimensioned for receiving a strand therebetween when said blade members are moved to the closed stripping position, wherein said blade members penetrate the protective material on said strands prior to the stripping operation.

4. A device as claimed in claim 3, said complementary blade members being located in said mounting means such that they are moved in a direction that is perpendicular to the axis of the strands to be stripped, wherein said blade members penetrate the protective material around the strands so that after said protective material is heated, said protective material is effectively stripped from said strands.

5. A device for stripping a protective material from a transmission carrier, comprising a pair of elongated grip members, means for pivotally mounting said grip members at one end thereof, the other ends of said grip members being movable relative to each other to and from a closed stripping position, guide means located in said mounting means between the pivot ends of said grip members and receiving therein the lead-in portion of the transmission carrier from which said protective material is to be stripped, blade means located in said mounting means and being engageable by said grip members for movement by said grip members into engaging relation with said protective material during a stripping operation wherein said blade means penetrate into said protective material, and means responsive movement of said grip members to a closed position for heating the portion of said protective material to be stripped to a temperature sufficient to produce a softening thereof, whereafter a longitudinal retracting movement of said transmission carrier strips the protective material from the lead-in portion thereof, said heating means including a heating chamber and a heating element located in said heating chamber, said heating chamber being mounted between said grip members, means for interconnecting said heating chamber to said grip members for movement of said heating chamber toward said blade means when said grip members are moved to a closed position, wherein said lead-in portion of said transmission carrier and protective material located thereon are received within said heating chamber and a heating zone as defined by the heating element therein.

6. A device for stripping a protective material as claimed in claim 5, said heating element including a resistance portion that is located adjacent to the end of said heating chamber in said heating zone and that receives said lead-in portion of said transmission carrier and that is energized to heat said lead-in portion to produce the softening of the protective material thereof.

7. A device for stripping a protective material as claimed in claim 6, said heating means further including batteries mounted in said grip members in series and being electrically interconnected to contact means that are fixed to said grip members said contact means being operable to establish an electrical circuit through said batteries and said heating element when said grip members are moved to a closed position, wherein said heating element is energized to heat said lead-in portion of said protective material to be stripped.

8. A device for stripping a protective material as claimed in claim 5, said interconnecting means including a body portion in which said heating means housing is fixed in frictional relation therein, arms secured to said body portion and to said grip members in angular relationship, wherein when said grip members are moved together to the closed stripping position said arms move therewith to force said body portion and heating chamber and heating element toward said blade means.

9. A device as claimed in claim 1, said heating means being responsive to movement of said grip members to a closed position for heating the lead-in portion of said protective material to be stripped.

10. A device as claimed in claim 9, said heating means including a heating chamber having a heating zone formed therein that is defined by a heating element located in said heating chamber, said lead-in portion to be stripped being received in said heating zone during a stripping operation for heating and softening the protective material of the lead-in portion to be stripped.

11. A device as claimed in claim 9, said heating means including a heating chamber and a heating element located in said heating chamber, battery means located on said grip members for supplying electrical energy to said heating element, and contact means mounted on said grip members and being operable to electrically interconnect said battery means and said heating element wherein said heating element is energized to heat said lead-in portion of said protective material to be stripped.

* * * * *